United States Patent Office 3,238,164
Patented Mar. 1, 1966

3,238,164
TALL OIL PITCH-$C_1$-$C_{18}$ MONOHYDRIC ALCOHOL COMPOSITIONS AND USE THEREOF IN RUBBER
Rhoads M. Speck, Hockessin Hills, Del., assignor to Hercules Powder Company, Wilmington, Del., a corporation of Delaware
No Drawing. Filed Nov. 6, 1963, Ser. No. 321,681
14 Claims. (Cl. 260—27)

This invention relates to improved tall oil pitch compositions and to the use of same as processing aids in rubber compounding.

The distillation of crude tall oil yields from about 15% to about 20% of a non-volatile fraction known as tall oil pitch. Tall oil pitch is a very complex mixture of high boiling polymerized fatty and resin acids, alcohols, esters, anhydrides, lactones and unidentified components; and because of its tackiness, poor flow properties and general sticky nature under ordinary conditions has found little use in industry.

An important object of the invention is the provision of a tall oil pitch composition having improved utility as a processing aid in compounding rubber.

A further object of the invention is the provision of improvements in the compounding of rubber involving the use as a processing aid, in such compounding, of a novel tall oil pitch composition.

In accordance with the present invention, it has now been discovered that when tall oil pitch is reacted with a $C_1$-$C_{18}$ monohydric alcohol or a mixture of such alcohols at elevated temperatures and pressures that the products obtained are quite different from the starting materials. Thus, treatment of tall oil pitch, as herein described, converts it from a tacky and difficult to handle material to a fluid balsamic liquid having a lower acid number, e.g., essentially neutral, and an increased volatiles content. When distilled, the volatile fraction is a neutral oil and the non-volatile fraction or residue is slightly more acidic than the distillate and has a softening point that is much higher than the original pitch.

The novel tall oil pitch composition, prepared as above described, can be used, without further treatment, as a processing aid in the compounding of rubber or, alternatively, can be further treated, as by distillation, to obtain a volatile liquid fraction in 40–50% yield, and the latter used as a processing aid in the compounding of rubber. These products, both the original undistilled product and the distilled product will generally be used in amounts from about 1 part to about 30 parts by weight, per 100 parts of rubber (before additives). Conventional compounding ingredients and procedures can be used. These tall oil pitch compositions are particularly useful in the compounding of synthetic rubbers from copolymers of butadiene and styrene, such as GR–S or SBR, but can be used in the compounding of other synthetic rubbers, such as butyl, cis-polyisoprene, cis-polybutadiene, EPR, EPT, neoprene and acrylonitrile-butadiene, as well as in the compounding of natural rubbers. BR–S is the art accepted abbreviation for government rubber styrene, EPR is the art accepted abbreviation for ethylene-propylene rubber, and EPT is the art accepted abbreviation for ethylene-propylene terpolymer.

The tall oil pitch contemplated for use herein in preparing the novel tall oil pitch compositions of the invention is the residue or still bottoms resulting from the fractional distillation of crude tall oil whereby the fatty and resin acids and other distillable materials are removed leaving the pitch. It is a tarry, dark brown substance, the specific characteristics of which vary somewhat depending on the composition of the crude tall oil, the conditions of treatment and so on. The following is a typical analysis of tall oil pitch obtained by the fractional distillation of tall oil.

| | |
|---|---|
| Acid number | 20–47 |
| Alcoholic saponification number | 95–115 |
| DEG saponification number[1] | 110–130 |
| Percent free fatty acids (calculated as oleic acids | 4–10 |
| Percent total fatty acids (determined by saponification at 100° C. and calculated as oleic acid) | 35–40 |
| Percent rosin acids (Linder-Persson) | 5–15 |
| Iodine number | 90–100 |
| Percent neutrals (by extraction) | 55–65 |
| Softening point (ring and ball, ° C.) | 25–50 |
| Color (Gardner, 50% in benzene) | >18 |
| Percent ash | 0.5–1.0 |
| Percent water | ~0.3 |

[1] The DEG saponification number represents milligrams KOH required to saponify one gram of sample. The reaction is carried out at reflux (about 175° C.) using 0.8 normal KOH in diethylene glycol-phenetol reagent. The high temperature permits complete saponification of high molecular esters, including those from rosin. The sample is heated with excess reagent (at least 100%) and the excess is titrated with ½ normal HCl. Blank values on the same amount of reagent as used for the sample are determined by the foregoing procedure.

Having described the invention generally, the following examples are given to illustrate specific embodiments thereof.

EXAMPLE 1

Six hundred grams of tall oil pitch (acid number 24.0, 3.8% fatty acids, 8.9% resin acids, DEG saponification number 130, molecular distillation residue (MDR) 88.7%, softening point (ring and ball) 26.5° C.) and 600 grams of anhydrous methanol were heated in a 3000-ml. stainless steel rocking autoclave to 300° C. for one hour. The pressure of the system was 1450 p.s.i. The reaction mixture was cooled to 180° C. and vented to remove unreacted methanol and other volatiles. A sample was removed and designated Product A.

The reaction was continued by pumping in another 600 grams of anhydrous methanol. The temperature was raised to 325° C. and held for one hour, during which time a pressure of 1,625 p.s.i. developed. The temperature was lowered to 180° C., the methanol vented and the product removed from the bomb. This was designated Product B.

A portion of Product A was separated by distillation to yield 40.3% of a volatile Product C and a 59.4% yield of a nonvolatile Product D. The boiling range of the volatile fraction was 117° C. at 0.18 mm. to 260° C. at 0.45 mm. Properties of the crude and distilled products are given in Table 1.

A portion of Product B was similarly distilled giving 47.5% distillate (Product E) and 51.0% residue (Product F). The original tall oil pitch was distilled under the same conditions to give 7.9% distillate (Product G) and 92.1% of residue (Product H). Analyses of these materials are given in Table 1.

Table 1.—Crude and distilled products discussed in Example 1

| Product | Percent yield on distillation | A.N. | DEG saponification number | Softening point, ° C. (R and B) |
|---|---|---|---|---|
| Original tall oil pitch | | 24 | 130 | 26.5. |
| A—Crude after 300° C | | 5.2 | 119 | Liquid. |
| C—Distillate from A | 40.3 | 2.7 | 144 | Do. |
| D—Residue from A | 59.4 | | | |
| B—Crude after 325° C | | 3.4 | 123 | Liquid. |
| E—Distillate from B | 47.5 | 3.4 | 121 | Do. |
| F—Residue from B | 51.0 | 6.3 | 100 | 49.5. |
| G—Distillate from original pitch | 7.9 | 136.6 | 148 | Liquid. |
| H—Residue from original pitch | 92.1 | 12.8 | 126 | 49.0. |

The term "molecular distillation residue (MDR)," as utilized herein, means the percent of nonvolatile matter that remains after heating the sample at 175° C. and a pressure of 5 microns or less for one hour.

EXAMPLE 2

Six hundred grams of the same tall oil pitch as described in Example 1 were charged to a 3000-ml. stainless steel rocking autoclave and heated to 275° C. Anhydrous methanol (600 grams) was added and the mixture was held at 275° C. for two hours. The system was cooled to 175° C. and vented to allow the unreacted methanol to distill out. A portion of the product was sampled (Product I). The reaction was continued by raising the temperature to 275° C. Three hundred grams of fresh methanol was added and the mixture was held at 275° C. for two more hours. The methanol was distilled out and the product removed (Product J). A portion of Product J was distilled at 117° C. at 0.18 mm. to 260° C. at 0.45 mm. to give 45.0% of a volatile fraction (Product K) and 54.6% of a nonvolatile fraction (Product L). The above operations were repeated at 300° and 325° C. The final product from each run was distilled as described for Product J. Analyses of the various products described in this example are given in Table 2.

EXAMPLE 3

Six hundred grams of the same tall oil pitch as used in Example 1 was heated to 300° C. in a 3000-ml. stainless bomb. Various amounts of methanol were added and allowed to react at 300 C. for four hours. The temperature was lowered to 175° C., the bomb was vented to allow the excess methanol to distill out and the product was removed. Each product was distilled into a volatile and nonvolatile fraction. Results are given in Table 3.

*Table 3.—Crude and distilled products discussed in Example 3*

| Product | Methanol/pitch (g./100 g.) | Mole ratio, methanol/ester [1] | Percent yield on distillation | A.N. | DEG sapon. number | Softening point, °C. (R and B) |
|---|---|---|---|---|---|---|
| U | 18.5 | 2.5 | | 11.1 | 108 | Liquid. |
| V | Distillate from U | | 43.5 | 7.6 | 124 | Do. |
| W | Residue from U | | 56.3 | 8.7 | 84 | 47.0 |
| X | 37.0 | 5.0 | | 9.2 | 103 | Liquid. |
| Y | Distillate from X | | 46.8 | 6.4 | 122 | Do. |
| Z | Residue from X | | 52.5 | 8.5 | | 48.0. |
| AA | 73.6 | 10.0 | | 6.3 | 98 | Liquid. |
| BB | Distillate from AA | | 48.3 | 4.3 | 120 | Do. |
| CC | Residue from AA | | 50.2 | 6.4 | 100 | 56.0. |
| DD | 150 [2] | 20.2 | | 3.8 | 92 | Liquid. |
| EE | Distillate from DD | | 46.6 | 2.2 | 131 | Do. |
| FF | Residue from DD | | 52.7 | 4.6 | 104 | |

[1] Includes ester, free acid and any other group that reacts with diethylene glycol-KOH reagent to give a saponification value of 130.
[2] Made using two passes of methanol with two hours for each pass.

EXAMPLE 4

Methanol and tall oil pitch (typical analyses acid number 20–47, resin acids 5–15%, fatty acids 4–10%, Hercules drop softening point 55° C.) were reacted continuously in a packed tower using countercurrent flow. The pitch was introduced at the top of the column at 200 parts per hour while methanol was pumped into the bottom at 360 parts per hour. The temperature was held at 320° C. and the system developed a pressure of 850 p.s.i. The crude reaction product (Product GG) was removed at the bottom of the column. It was continuously distilled at 285° C. at a vacuum of 29 inches to yield 48% distillate (Product HH) and 52% residue (Product II). Results are given in Table 4.

*Table 2.—Analyses of products discussed in Example 2*

| Product | Reaction temperature (° C.) | Percent yield on distillation | A.N. | DEG saponification number | Percent MDR |
|---|---|---|---|---|---|
| I | 275 (2 hr.) | | 8.5 | 106 | 53.4 |
| J | 275 (4 hr.) | | 5.0 | 103 | 48.5 |
| K | Distillate from J | 45.0 | 4.3 | 126 | Nil |
| L | Residue from J | 54.6 | 9.1 | 68 | 90.2 |
| M | 300 (2 hr.) | | 7.0 | 92 | 56.8 |
| N | 300 (4 hr.) | | 3.8 | 92 | 46.8 |
| O | Distillate from N | 46.6 | 2.2 | 131 | Nil |
| P | Residue from N | 52.7 | 4.6 | 104 | 90.2 |
| Q | 325 (2 hr.) | | 4.9 | 122 | 44.5 |
| R | 325 (4 hr.) | | 3.0 | 114 | 44.7 |
| S | Distillate from R | 51.0 | 3.5 | 112 | Nil |
| T | Residue from R | 47.2 | 7.2 | 98 | 93.8 |

Table 4

| Product | A.N. | Saponification number [1] | Percent MDR | Softening point, °C. (R and B) |
|---|---|---|---|---|
| GG | 0.5 | 58 | 56.5 | Liquid. |
| HH | 1.2 | 71.5 | 2.0 | Do. |
| II | 1.3 | 57 | 87.8 | 27.5. |

[1] Alcoholic saponification number.

EXAMPLE 5

Resin Products A, C and D were tested as rubber processing aids for styrene-butadiene rubber in comparison with a resin control and a no resin control utilizing the following laboratory recipe:

| | |
|---|---|
| SBR (styrene-butadiene rubber) | 100.0 |
| HAF carbon black (Philblack O) | 50.0 |
| Stearic acid (Stearex beads) | 2.0 |
| Zinc oxide (Horsehead XX4) | 3.0 |
| Benzothiazyl disulfide (Altax) | 1.0 |
| Diphenylguanidine | 0.3 |
| Sulfur | 1.75 |
| Resin | 10.0 |

A masterbatch, using 950 grams SBR, was prepared in a laboratory 1200-ml. "B" Banbury by mixing the styrene-butadiene rubber with the required amount of zinc oxide, carbon black, and stearic acid. The batch was thoroughly mixed with the time in the Banbury adjusted to give a dump temperature of about 300° F. Individual batches were prepared from the masterbatch and the other ingredients by milling on a two-roll mill at a temperature greater than 200° F. During this operation the stock was examined for ease of processability on the mill. After thorough mixing, the material was sheeted out and cured in closed laboratory molds at 290° F. for 15, 30, 45, 60 and 90 minutes. Building tack, Mooney viscosity and Mooney scorch were determined on uncured samples. Modulus, tensile strength, elongation, hardness, break set and resilience were determined on cured samples using ASTM test methods such as those described in D412. Physical properties were also determined for cured samples that had been aged in a circulating air oven for 48 hours at 212° F. Test results for uncured stocks and values for samples of optimum cure are given in Table 5. In Table 5 reference is made to Cumar MH 2½. Cumar is a proprietary designation for a series of neutral, stable synthetic resins of the p-coumarone-indene type, manufactured from selected distillates of tar. The MH indicates a resin of intermediate hardness and the 2½ is a color designation which has an approximate equivalent on the rosin scale of E.

Table 5.—Test data for uncured and cured stocks of compounded SBR—Example 5

| Test | Product A | Product C | Product D | No resin control | Resin control, Cumar MH 2½ |
|---|---|---|---|---|---|
| Uncured stocks: Mill roll processability | (1) | (1) | (1) | (2) | (1) |
| Building tack: | | | | | |
| Unaged | Good | Very good | Very good | Fair | Fair |
| Aged 1 week at room temp | Fair | Fair | Fair | Fair | Fair |
| Mooney viscosity (ML-4-212° F.) | 60 | 55 | 65 | 80 | 69 |
| Mooney scorch-MS-260° F. (minutes for 5-point rise) | 27 | 23 | 25 | 19 | 29 |
| Cured stocks: | | | | | |
| Modulus at 300%, p.s.i. | | | | | |
| Unaged | 1,700 | 1,700 | 1,700 | 2,860 | 1,900 |
| Aged | 2,450 | 2,800 | 2,300 | | 2,950 |
| Tensile strength, p.s.i. | | | | | |
| Unaged | 3,400 | 3,350 | 3,350 | 3,700 | 4,000 |
| Aged | 2,820 | 3,035 | 2,900 | 3,200 | 3,600 |
| Elongation, Percent | | | | | |
| Unaged | 480 | 480 | 500 | 370 | 550 |
| Aged | 350 | 340 | 360 | 240 | 360 |
| Hardness, A2 | | | | | |
| Unaged | 61 | 58 | 62 | 67 | 62 |
| Aged | 68 | 68 | 68 | 73 | 70 |
| Bashore resilience, percent | | | | | |
| Unaged | 36 | 36 | 31 | 35 | 34 |
| Aged | 35 | 35 | 33 | 35 | 28 |
| Break set, percent | | | | | |
| Unaged | 5 | 10 | 10 | 10 | 10 |
| Aged | 5 | 5 | 10 | 0 | 5 |

[1] Smooth, resin soluble.   [2] Fairly smooth, some tearing of compound.

EXAMPLE 6

Resin Product B was tested as a rubber processing aid for styrene-butadiene rubber (SBR) in comparison with the original tall oil pitch from which Product B was made utilizing the same laboratory recipe and compounding procedure as was used in Example 5. Bleeding tests were carried out using specimens of stock (approximately 0.375 x 0.625 x 0.075 inch) mounted with pressure-sensitive adhesive tape on an acetate-butyrate lacquered plaque. The samples were held at room temperature for 19 hours and observed. They were then exposed to a domestic 275-watt sunlamp. The specimens were exposed for 24 hours at 167° F. at a distance of 13 inches from the lamp. Results are given in Table 6 below.

Values listed for the cured stocks represent physical properties at the optimum cure times, 60 minutes for the original pitch and 45 minutes for Product B. The data show that the methylated product gave a faster cure rate than the untreated pitch. In addition, the methylated product produced a compound which showed less tendency to bleed. The uncured stock containing Product B had a lower Mooney viscosity and had a lower scorch time than the stock containing the untreated pitch.

*Table 6.—Test data for uncured and cured stocks of SBR*

| Test | Tall oil pitch (10 parts)[1] | Product B (10 parts)[1] |
|---|---|---|
| Uncured stocks: Mill roll processability | (²) | (²) |
| Building tack: | | |
| Unaged | Fair | Fair |
| Aged 1 week at room temperature | Poor | Poor |
| Mooney viscosity (ML-4-212° F.) | 65 | 56 |
| Mooney scorch-MS-260° F. (minutes for 5-point rise) | 33 | 24 |
| Cured stocks: | | |
| Modulus at 300%, p.s.i. | | |
| Unaged | 1,550 | 1,750 |
| Aged | 2,220 | 2,800 |
| Tensile strength, p.s.i. | | |
| Unaged | 3,285 | 3,630 |
| Aged | 3,175 | 3,100 |
| Elongation, percent | | |
| Unaged | 525 | 515 |
| Aged | 405 | 315 |
| Hardness, A2 | | |
| Unaged | 63 | 60 |
| Aged | 70 | 69 |
| Bashore resilience, percent | | |
| Unaged | 33 | 39 |
| Aged | 32 | 32 |
| Break set, percent | | |
| Unaged | 20 | 10 |
| Aged | 10 | 7 |
| Bleed tests: | | |
| Room temperature | No bleed (³) | No bleed (⁴) |
| 160° F. U.V. sunlamp | | |

[1] Based on 100 parts rubber.
[2] Smooth, resin soluble.
[3] Bled at all cure times.
[4] Slight bleed only at 15 min. time.

The tall oil pitch compositions of the invention can be prepared by heating a mixture of tall oil pitch and a $C_1$–$C_{18}$ monohydric alcohol at pressures from about 100 p.s.i. to about 2000 p.s.i. and at temperatures from about 200° C. to about 350° C. for a period of time from about 0.5 hour to about 6 hours. It is preferred to utilize pressures from about 500 p.s.i. to about 1750 p.s.i., temperatures from about 275° C. to about 325° C., and times from about one hour to about three hours.

The ratio of alcohol to pitch can be varied from about 2 to about 200 parts of alcohol per 100 parts of pitch. The lower range of alcohol concentration would give only partial conversion while the higher level of alcohol would give complete reaction but would be more costly unless a recovery system was used for the recovery of unreacted alcohol. The preferred ratio of alcohol to pitch is 15–80 parts of alcohol per 100 parts of pitch. Any of the monohydric alcohols having 1 to 18 carbon atoms such as methyl, ethyl, propyl, isopropyl, butyl, caprylic, cetyl and stearyl and mixtures of these can be used. The preferred alcohols, from the standpoints of availability, economy and yield of volatile products, are methyl, ethyl, propyl and isopropyl.

As previously indicated, the treatment herein described converts the tall oil pitch from a tacky and difficult to handle material to a readily handled fluid product of lower acid number and increased volatiles. Thus, the acid number of the untreated tall oil pitch can be reduced from about 20–30 to about 5–10 or lower for the treated pitch and the quantity of volatiles increased from about 8–10% for the untreated pitch to about 45–50% for the treated pitch.

In the compounding of rubber in accordance with the invention, the tall oil pitch compositions herein described are used in conjunction with other well-known types of compounding ingredients such as vulcanizing agents, vulcanization accelerators and accelerator-activators, plasticizing agents, antioxidants and so on. Any suitable or conventional procedures can be used. For example, in the laboratory, a procedure similar to that utilized in Examples 5 and 6 gives quite satisfactory results. For commercial operations, the following procedure can be used. Four hundred pounds of 1.2 gravity stock is charged to a Number 11 Banbury where it is blended with all the materials except sulfur and accelerators. The mixing time is about 1½ to 7½ minutes. The conditions are adjusted so that the temperature of the batch rises to about 300–340° F. at the end of the mixing cycle. The batch is dropped from the Banbury to an associated mill for predetermined additional mixing. The slabs are cooled, usually overnight. They are then recharged to the Number 11 Banbury along with sulfur and accelerators. The temperature is maintained at about 190–220° F. during 1½ to 2½ minutes. The compounded stock is then transferred to a mill as in the first part of the cycle or a train of mills. It then goes to the extruder or calender for manufacturing the end product.

The amount of tall oil pitch composition to be used will be determined by the physical properties that are desired for the cured rubber and the end use of the finished product. In general it will be desirable to utilize at least about 1 part and not more than about 30 parts by weight per 100 parts of rubber (before additives). It is preferred to utilize from about 5 parts to about 20 parts by weight per 100 parts by weight of rubber (before additives).

While applicant does not intended to be bound by any particular theory, it appears that the difference in characteristics between the treated and untreated tall oil pitch may be due, in large part, to a number of chemical reactions including (1) the esterification of free rosin and fatty acids with the monohydric alcohol to form the corresponding esters, (2) the alcoholysis of rosin and fatty esters of high molecular weight alcohols to give the corresponding esters and the high molecular weight alcohol, i.e., transesterification, (3) the cleavage of anhydrides and lactones to yield esters, and (4) the conversion of phenolic derivatives to their alkyl ethers.

The present invention permits the upgrading of a by-product of the paper industry, largely used for fuel at the present time, into a product useful as a processing aid in the compounding of rubber to reduce the mixing and processing temperature, aid in incorporating and dispersing dry compounds, to reduce nerve (shrinkage) at the extruder or calender and to improve flow during molding. Moreover, because it increases plasticity of the stock, less power is consumed and less heat is generated during milling.

What I claim and desire to protect by Letters Patent is:

1. A method which comprises reacting tall oil pitch and a $C_1$–$C_{18}$ monohydric alcohol at a temperature of from about 200 to about 350° C. and at a pressure of from about 100 p.s.i. to about 2000 p.s.i., the amount of alcohol employed in carrying out the reaction being at least about 2 parts for each 100 parts of tall oil pitch.

2. The method of claim 1 in which the amount of monohydric alcohol employed in carrying out the reaction is from about 15 parts to 80 parts for each 100 parts of tall oil pitch.

3. The method of claim 1 in which the monohydric alcohol is methyl alcohol.

4. The method of claim 1 in which the monohydric alcohol is ethyl alcohol.

5. The method of claim 1 in which the monohydric alcohol is propyl alcohol.

6. The method of claim 1 in which the monohydric alcohol is isopropyl alcohol.

7. The reaction product derived in accordance with the method of claim 1.

8. The reaction product derived in accordance with the method of claim 2.

9. The reaction product derived in accordance with the method of claim 3.

10. The reaction product derived in accordance with the method of claim 4.

11. The reaction product derived in accordance with the method of claim 5.

12. The reaction product derived in accordance with the method of claim 6.

13. In a method of compounding rubber selected from the group consisting of styrene-butadiene copolymer, isoprene-isobutylene copolymer, cis-polyisoprene, cis-polybutadiene, ethylene-propylene copolymer, ethylene-propylene terpolymer, polychlorobutadiene, acrylonitrile-butadiene copolymer, and natural rubber the improvement which comprises incorporating with the rubber during processing thereof from about 1 part to about 30 parts by weight, for each 100 parts by weight of rubber, of a tall oil pitch composition derived by reacting tall oil pitch and a $C_1$–$C_{18}$ monohydric alcohol at a temperature of from about 200° to about 350° C. and at a pressure of from about 100 p.s.i. to about 2,000 p.s.i., the amount of alcohol employed in carrying out the reaction being at least about 2 parts for each 100 parts of tall oil pitch.

14. A rubber composition produced in accordance with the method of claim 13.

References Cited by the Examiner
UNITED STATES PATENTS 3,157,609   11/1964   NcNay et al. _____ 260—27

LEON J. BERCOVITZ, *Primary Examiner.*

MURRAY TILLMAN, *Examiner.*